United States Patent
Petermann et al.

(10) Patent No.: US 10,196,461 B2
(45) Date of Patent: Feb. 5, 2019

(54) EFFICIENT PROCESS FOR PREPARING AN ESTER OF A CELLULOSE ETHER

(71) Applicant: Dow Global Technologies LLC, Midland, MI (US)

(72) Inventors: Oliver Petermann, Hamburg (DE); Matthias Sprehe, Walsrode (DE); Robert B. Appell, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/521,088

(22) PCT Filed: Oct. 21, 2015

(86) PCT No.: PCT/US2015/056595
§ 371 (c)(1),
(2) Date: Apr. 21, 2017

(87) PCT Pub. No.: WO2016/069343
PCT Pub. Date: May 6, 2016

(65) Prior Publication Data
US 2017/0355783 A1    Dec. 14, 2017

Related U.S. Application Data

(60) Provisional application No. 62/073,280, filed on Oct. 31, 2014.

(51) Int. Cl.
  C08B 13/00    (2006.01)
  C08L 1/32    (2006.01)
  C09D 101/32    (2006.01)

(52) U.S. Cl.
  CPC ............... *C08B 13/00* (2013.01); *C08L 1/32* (2013.01); *C09D 101/32* (2013.01)

(58) Field of Classification Search
  None
  See application file for complete search history.

(56) References Cited

U.S. PATENT DOCUMENTS

| | | | | |
|---|---|---|---|---|
| 2,689,863 A | * | 9/1954 | Broderick | C07C 51/56 526/232.3 |
| 2,912,430 A | | 11/1959 | Kosche | |
| 3,629,237 A | | 12/1971 | Koyanagi et al. | |
| 4,226,981 A | | 10/1980 | Onda et al. | |
| 5,114,535 A | * | 5/1992 | Burley | C08B 3/06 162/157.6 |
| 5,776,501 A | | 7/1998 | Kokubo et al. | |
| 2004/0152886 A1 | | 8/2004 | Cho et al. | |

FOREIGN PATENT DOCUMENTS

| | | |
|---|---|---|
| JP | 2007-217470 | 8/2007 |
| WO | 2005115330 A2 | 12/2005 |
| WO | 2009061815 A1 | 5/2009 |
| WO | 2011159626 A1 | 12/2011 |
| WO | 2013148154 A1 | 10/2013 |
| WO | 2014031448 A1 | 2/2014 |
| WO | 2014137779 A1 | 9/2014 |
| WO | 2015041973 A1 | 3/2015 |

* cited by examiner

*Primary Examiner* — Layla D Berry
(74) *Attorney, Agent, or Firm* — Ballard Spahr LLP

(57) ABSTRACT

A process for producing an esterified cellulose ether can be efficiently be produced by reacting a moist cellulose ether having a water content of at least 10 percent, based on the weight of the moist cellulose ether, with an aliphatic monocarboxylic acid anhydride, a dicarboxylic acid anhydride or a combination thereof. Further improvements in efficiency and reduction in process steps are achieved in a process for producing an esterified cellulose ether which comprises the steps of a) reacting cellulose with an alkaline material to produce alkali cellulose, b) reacting the produced alkali cellulose with one or more etherifying agents and washing the produced cellulose ether to obtain a moist cellulose ether having a water content of at least 10 weight percent, and c) reacting the moist cellulose ether with an aliphatic monocarboxylic acid anhydride and/or a dicarboxylic acid anhydride and with a depolymerizing agent.

15 Claims, No Drawings

EFFICIENT PROCESS FOR PREPARING AN ESTER OF A CELLULOSE ETHER

FIELD

The present invention relates to a process of improved efficiency for producing an ester of a cellulose ether by reacting the cellulose ether with an aliphatic monocarboxylic acid anhydride and/or a dicarboxylic acid anhydride.

INTRODUCTION

Esters of cellulose ethers, their uses and processes for preparing them are generally known in the art. Various known esters of cellulose ethers are useful as enteric polymers for pharmaceutical dosage forms, such as methylcellulose phthalate, hydroxypropyl methylcellulose phthalate (HPMCP), methylcellulose succinate, or hydroxypropyl methylcellulose acetate succinate (HPMCAS). Enteric polymers are those that are resistant to dissolution in the acidic environment of the stomach. Dosage forms coated with such polymers protect the drug from inactivation or degradation in the acidic environment or prevent irritation of the stomach by the drug.

U.S. Pat. No. 4,226,981 discloses a process for preparing mixed esters of cellulose ethers, such as HPMCAS, by esterifying hydroxypropyl methylcellulose with succinic anhydride and acetic anhydride in the presence of an alkali carboxylate as the esterification catalyst and acetic acid as the reaction medium.

U.S. Pat. No. 5,776,501 lists various cellulosic polymers, vinyl polymers or acrylic polymers as a basis for enteric coatings, such as cellulose acetate phthalate, cellulose acetate trimelliatte, hydroxypropyl methylcellulose phthalate, hydroxypropyl methylcellulose acetate succinate and carboxymethylethyl cellulose, polyvinyl alcohol acetate phthalate, or copolymers of methacrylic acid and ethyl acrylate. More specifically, U.S. Pat. No. 5,776,501 teaches the usage of a water-soluble cellulose ether, such as hydroxypropyl methyl cellulose (HPMC), for producing hydroxypropyl methyl cellulose acetate maleate. The hydroxypropyl methyl cellulose acetate maleate is used as coating base for enteric pharmaceutical preparations. The water-soluble cellulose ether has a viscosity of 3 to 10 cp (=mPa·s), determined as a 2% by weight aqueous solution. If the viscosity is less than 3 cp, the finally obtained coating film for solid enteric pharmaceutical preparations is insufficient in strength, while if it exceeds 10 cp, the viscosity observed when the cellulose ether is dissolved in a solvent to carry out a substitution reaction becomes extremely high and homogeneous mixing and handling for further treatment is very difficult. International patent applications WO 2005/115330 and WO 2011/159626 disclose the preparation of hydroxypropyl methylcellulose acetate succinate (HPMCAS). HPMC having an apparent viscosity of 2.4 to 3.6 cp is recommended as a starting material. Alternatively, a HPMC starting material of 600 to 60,000 Daltons, preferably 3000 to 50,000 Daltons, more preferably 6,000 to 30,000 Daltons is recommended. According to Keary [Keary, C. M.; Carbohydrate Polymers 45 (2001) 293-303, Tables 7 and 8] HPMC having a weight average molecular weight of about 85-100 kDa has a viscosity of about 50 mPa·s, determined as a 2% by weight aqueous solution. The produced HPMCAS is useful for enhancing the concentration of a dissolved active agent, for example for enhancing the bioavailability of poorly water-soluble drugs.

U.S. Pat. No. 3,629,237 discloses reacting phthalic anhydride with a cellulose ether in the presence of an organic acid and a catalyst, such as anhydrous sodium acetate and potassium acetate, and in the presence of alkali metal salts of oxyacids of halogens, such as potassium chlorate, potassium bromated, and sodium chlorate, which facilitates the production of low-viscosity acid phthalates of cellulose ethers. Hydroxypropyl methylcellulose (HPMC) having a viscosity of 15 to 100 cps, determined as a 2% by weight aqueous solution, is used as a starting material for the reaction with phthalic anhydride.

However, the known production processes have several disadvantages. On the one hand the use of cellulose ethers of increased viscosity would be beneficial for several end-uses of the produced esterified cellulose ethers, e.g., to provide strong films for coating pharmaceutical dosage forms, as disclosed in in U.S. Pat. No. 5,776,501. On the other hand, using a water-soluble cellulose ether of increased viscosity, determined as a 2% by weight aqueous solution, also increases the viscosity of the cellulose ether in a solvent that is typically used for the esterification reaction, such as acetic acid. As disclosed in in U.S. Pat. No. 5,776,501, the viscosity of the water-soluble cellulose ether in acetic acid is extremely high if the cellulose ether has a viscosity of more than 10 mPa·s, determined as a 2% by weight aqueous solution. Depending on the viscosity of the cellulose ether, stirring of the reaction mixture to provide a homogeneous mixture is very difficult or even impossible. However, the use of cellulose ethers having a viscosity in the range of 2.4 to 10 mPa·s as starting material for the esterification, as recommended in the prior art, requires depolymerization of cellulose ethers to a large degree prior to their esterification. Processes for depolymerizing cellulose ethers are described, for example, in European Patent Applications EP 1,141,029; EP 210,917; and EP 1,423,433; and in U.S. Pat. No. 4,316,982.

The known partial depolymerization of cellulose ethers with an acid, such as HCl, followed by neutralization before the esterification step results in a cost-intensive multistep production process and involves drying and grinding of the cellulose ether before or after partial depolymerization and the handling steps associated with drying and grinding, such as packaging and storing.

Partial depolymerization of cellulose ethers is also required when using cellulose ethers having viscosities of 15 to 100 mPa·s for the reaction with phthalic anhydride, as suggested in U.S. Pat. No. 3,629,237.

One object of the present invention is to provide a process for preparing an ester of a cellulose ether, wherein the stirrability of a reaction mixture comprising a cellulose ether and one or more anhydrides used as esterification agents is improved. A preferred object of the present invention is to provide a process for preparing an ester of a cellulose ether wherein a reaction mixture comprising a cellulose ether and one or more anhydrides can even be stirred when the cellulose ether has an initial viscosity that is higher than 10 mPa·s or even higher than 100 mPa·s, determined as a 2% by weight solution in water. Another preferred object of the present invention is to provide a process for preparing an ester of a cellulose ether wherein the number of process steps can be reduced. It would be particularly desirable to provide a process for preparing an ester of a cellulose ether, wherein the cellulose ether does not have to be depolymerized to a substantial degree or even not at all before it is esterified.

SUMMARY

It has surprisingly been found that the stirrability of a reaction mixture comprising a cellulose ether and one or more anhydrides used as esterification agents can be improved when a moist cellulose ether is used as a starting material which has a water content of at least 10 percent, based on the weight of the moist cellulose ether.

It has even more surprisingly been found that process steps between the production of a cellulose ether and the esterification of the cellulose ether, which are disclosed in the prior art and taught as being required, can be reduced or even avoided, specifically the steps of i) drying and grinding the cellulose ether, and ii) partial depolymerization of the cellulose ether with an acid, such as HCl, followed by neutralization and purification before the esterification step and the handling steps associated with steps i) and ii), such as packaging and storing.

Accordingly, one aspect of the present invention is a process for producing an esterified cellulose ether wherein a moist cellulose ether having a water content of at least 10 percent, based on the weight of the moist cellulose ether, is reacted with an aliphatic monocarboxylic acid anhydride, a dicarboxylic acid anhydride or a combination thereof.

Another aspect of the present invention is a process for producing an esterified cellulose ether which comprises the steps of a) reacting cellulose with an alkaline material to produce alkali cellulose, b) reacting the produced alkali cellulose with one or more etherifying agents and washing the produced cellulose ether to obtain a moist cellulose ether having a water content of at least 10 weight percent, and c) reacting the moist cellulose ether with an aliphatic monocarboxylic acid anhydride and/or a dicarboxylic acid anhydride and with a depolymerizing agent.

DETAILED DESCRIPTION

In the prior art processes cellulose ethers are used as dry starting material for the production of esterified cellulose ethers. As defined in the European Pharmacopeia Ph Eur 6 2008, Hypromellose, page 2819, "dry" means that the cellulose ether has a water content of not more than 5 percent, based on the total weight of the cellulose ether, It is known that water comprised in moist cellulose ethers readily reacts with anhydrides used for esterification and thus competes with the esterification reaction. Contrary to the teaching of the prior art, the use of a moist cellulose ether as a starting material for esterification with one or more anhydrides has been found to be beneficial. The stirrability of the reaction mixture has found to be improved. Moreover, using a moist cellulose ether allows reducing the number of process steps. Significant savings in costs can be achieved since the time, labor and energy consuming drying procedure can be partially or even completely avoided.

The cellulose ether which is used as a starting material in the process of the present invention can be produced in known manner, for example in a process which comprises the steps of a) reacting cellulose with an alkaline material to produce alkali cellulose, and b) reacting the produced alkali cellulose with one or more etherifying agents. Typically cellulose in finely divided state, such as cellulose pulp, is reacted in step a) with an aqueous alkaline solution, preferably an aqueous alkali metal hydroxide solution, more preferably an aqueous sodium hydroxide solution. The aqueous alkaline solution preferably has an alkali metal hydroxide content of from 30 to 70 percent, more preferably from 35 to 60 percent, based on the total weight of the aqueous alkaline solution. The alkaline solution is generally sprayed upon the cellulose and reacted therewith in an alkalization reaction to form the alkali cellulose. In one embodiment, an organic solvent such as dimethyl ether is added to the reactor as a diluent and a coolant. Likewise, the headspace of the reactor is optionally purged with an inert gas (such as nitrogen) to control oxygen-catalyzed depolymerization of the cellulose ether product. Known etherifying agents are, for example, alkylating agents, such as methyl chloride, dimethyl sulfate or ethyl chloride; and hydroxyalkylating agents, such as ethylene oxide, propylene oxide and/or butylene oxide. Processes for producing cellulose ethers have been described in many publications, a more recent being U.S. Pat. Nos. 4,477,657 and 3,839,319. An overview of the chemical fundamentals and principles of production (production processes and process steps) and a list of substances and description of the properties and potential uses of the various cellulose ethers is disclosed, for example, in Houben-Weyl, Methoden der Organischen Chemie, Makromolekulare Stoffe [Methods of Organic Chemistry, Macromolecular Substances], 4th edition, volume E 20, page 2042 (1987).

In known production processes the produced crude cellulose derivative is washed to remove salt and other reaction by-products. Before or after washing, the cellulose ether may be stripped by exposure to steam to reduce residual organic content. Cellulose ethers are generally washed at a temperature of at least 20° C., typically of at least 45° C., and more typically of at least 65° C. Typically a temperature of up to 120° C., preferably up to 95° C. is suitable for the washing step. The washing step typically includes separating the cellulose ether from the washing water, for example by sedimentation, centrifugation or filtration. The moist cellulose ether is usually obtained in the shape of moist granules, moist lumps and/or a moist paste, e.g., in the shape of a water-moist filter cake. After the above-described washing step a moist cellulose ether having a water content of at least 10 weight percent, generally at least 30 weight percent, and typically at 40 weight percent, based on the total weight of the moist cellulose ether, is obtained. After the washing step the water content of the cellulose ether is generally up to 80 percent, typically up to 60 percent, based on the total weight of the moist cellulose ether.

In known procedures the moist cellulose ether is typically dried to a reduced moisture content of 0.5 to 5.0 weight percent water, based upon the total weight of the cellulose ether, i.e., based on the sum of the weight of cellulose ether and water. The reduced moisture content facilitates grinding of the cellulose ether, which is typically carried out after or simultaneously with drying.

According to the above-mentioned process a cellulose ether is obtained which generally has a viscosity of more than 200 mPa·s, typically at least 300 mPa·s, more typically at least 500 mPa·s, or at least 1000 mPa·s, and most typically least 1500 mPa·s, or at least 2000 mPa·s or even at least 3000 mPa·s. The viscosity is generally up to 100,000 mPa·s, typically up to 30,000 mPa·s, more typically up to 15,000 mPa·s, and most typically up to 7,000 mPa·s or up to 5,000 mPa·s, depending on the molecular weight of the cellulose that is chosen for the etherification reaction. The viscosity of the cellulose ether is determined as a 2 weight-% solution in water at 20° C. as described in the United States Pharmacopeia (USP 35, "Hypromellose", pages 423-424 and 3467-3469). As described in the United States Pharmacopeia, viscosities of less than 600 mPa·s are determined by Ubbelohde viscosity measurement and viscosities of 600 mPa·s or more are determined using a Brookfield viscometer. Descriptions on preparing the 2 wt. % HPMC solution and both Ubbelohde and Brookfield viscosity measurement conditions are disclosed in the United States Pharmacopeia (USP 35, "Hypromellose", pages 423-424 and 3467-3469 and in ASTM D-445 and ISO 3105 referenced therein).

If a lower viscosity of the cellulose ether is desired than as described above, the cellulose ether can be subjected to a partial depolymerization process. Partial depolymerization processes are well known in the art and described, for example, in European Patent Applications EP 1,141,029; EP 210,917; and EP 1,423,433; and in U.S. Pat. No. 4,316,982.

In contrast to the procedures known in the art, in the process of the present invention a moist cellulose ether is used as a starting material which has a water content of at least 10 percent, preferably at least 20 percent, more preferably at least 30 percent, even more preferably at least 40 percent, and most preferably at least 50 percent, based on the weight of the moist cellulose ether. The moist cellulose ether used as a starting material for the esterification process of the present invention generally has a water content of up to 90 percent, preferably up to 85 percent, more preferably up to 80 percent, even more preferably up to 70 percent, and most preferably up to 60 percent, based on the weight of the moist cellulose ether.

The cellulose ether having an above-mentioned water content can be achieved by mixing a dry cellulose ether in particulate form, typically a cellulose ether which has been dried and ground as described above, with water in the appropriate amounts.

However, in a preferred embodiment of the present invention the cellulose ether having an above-mentioned water content is achieved in a process which comprises the above described steps of a) reacting cellulose with an alkaline material to produce alkali cellulose, b) reacting the produced alkali cellulose with one or more etherifying agents, and washing the produced cellulose ether to obtain a moist cellulose ether having a water content of at least 10 weight percent, based on the weight of the moist cellulose ether, or an above-mentioned preferred water content. The washing step is optionally followed by a partial drying step to obtain the desired water content, but the partial drying step should not reduce the water content to less than 10 weight percent or an above-mentioned preferred water content. In a more preferred embodiment of the invention the washed cellulose ether is not subjected to a drying step. In these embodiments of the process of the present invention significant savings in energy, labor and time can be achieved since the time, labor and energy consuming the drying and grinding procedures can be partially or even completely eliminated.

When carrying out the esterification reaction of the present invention, it has been found that the reaction mixture is well stirrable when a moist cellulose ether is used as a starting material which has a water content as described above. Preferred compositions of the reaction mixture are described further below. Surprisingly it has been found that the reaction mixture is well stirrable even when a cellulose ether is used that has an initial viscosity of more than 10 mPa·s, or at least 50 mPa·s, or at least 150 mPa·s, or at least 300 mPa·s or even at least 500 mPa·s measured as a 2 weight-% solution in water at 20° C. as described in USP 35. It has even more surprisingly been found that the reaction mixture is reasonably well stirrable, even when a cellulose ether is used that has an initial viscosity of at least 1000 mPa·s, or at least 1500 mPa·s, or even at least 2000 mPa·s or at least 3000 mPa·s, determined as a 2% by weight solution in water as described in USP 35. For achieving a reasonable stirrability of the reaction mixture, the cellulose ether should generally have an initial viscosity of up to 100,000 mPa·s, typically up to 30,000 mPa·s, preferably up to 15,000 mPa·s, more preferably up to 7,000 mPa·s, and most preferably up to 5,000 mPa·s, measured as stated above.

Cellulose ethers having a high initial viscosity, for example at least 500 mPa·s, or at least 1000 mPa·s, or at least 1500 mPa·s, or at least 2000 mPa·s or even at least 3000 mPa·s, determined as a 2% by weight solution in water as described in USP 35, can be produced according to known procedures by alkalizing cellulose with an alkaline material and etherifying the produced alkali cellulose, without subjecting the cellulose, the alkali cellulose or the cellulose ether to a depolymerization reaction. Using a cellulose ether having an above-mentioned high initial viscosity does not only make drying of the cellulose ether redundant but also partial depolymerization of the cellulose ether with an acid, such as HCl, neutralization and purification before the esterification step. Partial depolymerization can be carried out in combination with the esterification step as described further below. Hence, the cost-intensive multi-step process for producing esterified cellulose ethers can simplified and the number of reaction steps can be reduced. Thus the production costs can be significantly reduced. Therefore, a moist cellulose ether having an initial viscosity as stated above is preferably used in the esterification process of the present invention.

The cellulose ether can have a lower initial viscosity than stated above. Even when a cellulose ether of lower initial viscosity is used, the process of the present invention is advantageous. Time, labor and energy consuming drying of the cellulose ether after a processing step such as washing can be reduced or even completely avoided. However, the main advantages of the present invention, such as a further reduced number of production steps and improved stirrability of the reaction mixture, are particularly significant when a cellulose ether of higher initial viscosity as described above is used.

In the term "the viscosity of the cellulose ether, determined as a 2% by weight solution in water", 2% refers to the absolutely dry weight of the cellulose ether. The term "initial viscosity" as used herein means the viscosity of the cellulose ether before the cellulose ether reacts with any reagents in the esterification reaction described hereafter and before the cellulose ether optionally reacts with a depolymerizing agent as described hereafter.

The cellulose ether used as a starting material in the process of the present invention has a cellulose backbone having β-1,4 glycosidically bound D-glucopyranose repeating units, designated as anhydroglucose units in the context of this invention. The cellulose ether used as a starting material in the process of the present invention preferably is an alkyl cellulose, hydroxyalkyl cellulose or hydroxyalkyl alkylcellulose. This means that in the cellulose ether utilized in the process of the present invention, at least a part of the hydroxyl groups of the cellulose backbone of the anhydroglucose units are substituted by alkoxyl groups or hydroxyalkoxyl groups or a combination of alkoxyl and hydroxyalkoxyl groups. The hydroxyalkoxyl groups are typically hydroxymethoxyl, hydroxyethoxyl and/or hydroxypropoxyl groups. Hydroxyethoxyl and/or hydroxypropoxyl groups are preferred. Typically one or two kinds of hydroxyalkoxyl groups are present in the cellulose ether. Preferably a single kind of hydroxyalkoxyl group, more preferably hydroxypropoxyl, is present. The alkoxyl groups are typically methoxyl, ethoxyl and/or propoxyl groups. Methoxyl groups are preferred.

Illustrative of the above-defined cellulose ethers are alkylcelluloses, such as methylcellulose, ethylcellulose, and propylcellulose; hydroxyalkylcelluloses, such as hydroxyethylcellulose, hydroxypropylcellulose, and hydroxybutylcellulose; and hydroxyalkyl alkylcelluloses, such as hydroxyethyl methylcellulose, hydroxymethyl ethylcellulose, ethyl hydroxyethylcellulose, hydroxypropyl methylcellulose, hydroxypropyl ethylcellulose, hydroxybutyl methylcellulose, and hydroxybutyl ethylcellulose; and those having two or more hydroxyalkyl groups, such as hydroxyethylhydroxypropyl methylcellulose. Most preferably, the cellulose ether is a hydroxypropyl methylcellulose.

The degree of the substitution of hydroxyl groups of the anhydroglucose units by hydroxyalkoxyl groups is expressed by the molar substitution of hydroxyalkoxyl groups, the MS(hydroxyalkoxyl). The MS(hydroxyalkoxyl) is the average number of moles of hydroxyalkoxyl groups per anhydroglucose unit in the cellulose ether. It is to be understood that during the hydroxyalkylation reaction the hydroxyl group of a hydroxyalkoxyl group bound to the cellulose backbone can be further etherified by an alkylation agent, e.g. a methylation agent, and/or a hydroxyalkylation agent. Multiple subsequent hydroxyalkylation etherification reactions with respect to the same carbon atom position of an anhydroglucose unit yields a side chain, wherein multiple hydroxyalkoxyl groups are covalently bound to each other by ether bonds, each side chain as a whole forming a hydroxyalkoxyl substituent to the cellulose backbone.

The term "hydroxyalkoxyl groups" thus has to be interpreted in the context of the MS(hydroxyalkoxyl) as referring to the hydroxyalkoxyl groups as the constituting units of hydroxyalkoxyl substituents, which either comprise a single hydroxyalkoxyl group or a side chain as outlined above, wherein two or more hydroxyalkoxyl units are covalently bound to each other by ether bonding. Within this definition it is not important whether the terminal hydroxyl group of a hydroxyalkoxyl substituent is further alkylated or not; both alkylated and non-alkylated hydroxyalkoxyl substituents are included for the determination of MS(hydroxyalkoxyl). The esterified cellulose ether generally has a molar substitution of hydroxyalkoxyl groups of at least 0.05, preferably at least 0.08, more preferably at least 0.12, and most preferably at least 0.15. The degree of molar substitution is generally not more than 1.00, preferably not more than 0.90, more preferably not more than 0.70, and most preferably not more than 0.50.

The average number of hydroxyl groups substituted by alkoxyl groups, such as methoxyl groups, per anhydroglucose unit, is designated as the degree of substitution of alkoxyl groups, DS(alkoxyl). In the above-given definition of D S, the term "hydroxyl groups substituted by alkoxyl groups" is to be construed within the present invention to include not only alkylated hydroxyl groups directly bound to the carbon atoms of the cellulose backbone, but also alkylated hydroxyl groups of hydroxyalkoxyl substituents bound to the cellulose backbone. The cellulose ethers used as a starting material in the process of the present invention preferably have a DS(alkoxyl) of at least 1.0, more preferably at least 1.1, even more preferably at least 1.2, most preferably at least 1.4, and particularly at least 1.6. The DS(alkoxyl) is preferably not more than 2.5, more preferably not more than 2.4, even more preferably not more than 2.2, and most not more than 2.05. The degree of substitution of alkoxyl groups and the molar substitution of hydroxyalkoxyl groups can be determined by Zeisel cleavage of the cellulose ether with hydrogen iodide and subsequent quantitative gas chromatographic analysis (G. Bartelmus and R. Ketterer, Z. Anal. Chem., 286 (1977) 161-190). Most preferably the cellulose ether utilized in the process of the invention is hydroxypropyl methylcellulose having a DS(methoxyl) within the ranges indicated above for DS(alkoxyl) and an MS(hydroxypropoxyl) within the ranges indicated above for MS(hydroxyalkoxyl).

A depolymerizing agent is preferably used in the esterification process of the present invention. When partial depolymerization is carried out in combination with the esterification step, the cost-intensive multi-step process for producing esterified cellulose ethers can simplified and the number of reaction steps can be reduced. More, specifically the separate steps of i) drying the cellulose ether, and ii) partial depolymerization of the cellulose ether with an acid, such as HCl, followed by neutralization and purification before the esterification step can be avoided. Thus the production costs can be significantly reduced.

In a preferred aspect of the invention the depolymerizing agent is selected from oxidizing agents, typically oxidizing agents which are different from oxygen, such as ozone, peroxides, halites, halates, perhalates, hypohalites and perborates, and hydrogen peroxide. Preferred depolymerizing agents are alkali metal chlorites, alkali metal chlorates, such as potassium chlorate or sodium chlorate, alkali metal perchlorates, alkali metal periodates, alkali metal hypobromites, alkali metal hypochlorites, alkali metal hypoiodites, alkali metal peroxides, and hydrogen peroxide. Sodium and potassium are the preferred alkali metals.

In another preferred aspect of the invention an inorganic acid is used as a depolymerizing agent, such as a hydrogen halide, preferably hydrogen chloride; sulfuric acid, nitric acid, phosphoric acid, or persulfuric acid. When using an inorganic acid as depolymerizing agent, a neutralizing agent, such as sodium hydroxide, sodium bicarbonate, or sodium carbonate, is typically added to the reaction mixture after the desired degree of depolymerization has been achieved.

The amount of depolymerizing agent is generally at least 0.005 mole, preferably at least 0.01 mole, more preferably at least 0.02 mole, and most preferably at least 0.03 mole, per mole of anhydroglucose units of the cellulose ether. The amount of depolymerizing agent is generally up to 1 mole, preferably up to 0.70 mole, more preferably up to 0.40 mole, and most preferably up to 0.30 mole, per mole of anhydroglucose units of the cellulose ether.

One or more types of depolymerizing agents can be used, but their total amount is preferably chosen to be within the above described molar ratios between the depolymerizing agent and the anhydroglucose units of the cellulose ether.

When the moist cellulose ether is contacted with an aliphatic monocarboxylic acid anhydride, a dicarboxylic acid anhydride or a combination thereof, water in the moist cellulose ether reacts with the aliphatic monocarboxylic acid anhydride, the dicarboxylic acid anhydride or the combination thereof. Hence, the water content in the cellulose ether should be taken into account when determining the amount of aliphatic monocarboxylic acid anhydride and/or dicarboxylic acid anhydride that is needed for the reaction with the cellulose ether to achieve the desired degree of substitution with ester groups. Although the aliphatic monocarboxylic acid anhydride and/or dicarboxylic acid anhydride can be reacted simultaneously with water and the cellulose ether, these reactions are preferably conducted in sequence.

In a preferred embodiment of the process first water in the moist cellulose ether is reacted with an aliphatic monocarboxylic acid anhydride and/or a dicarboxylic acid anhydride and subsequently the cellulose ether is reacted with the aliphatic monocarboxylic acid anhydride and/or the dicarboxylic acid anhydride. In a more preferred embodiment, first water in the moist cellulose ether is reacted with an aliphatic monocarboxylic acid anhydride and subsequently the cellulose ether is reacted with an aliphatic monocarboxylic acid anhydride, a dicarboxylic acid anhydride or a combination thereof.

When water in the moist cellulose ether is reacted with an aliphatic monocarboxylic acid anhydride, two moles of the corresponding aliphatic monocarboxylic acid per mole of aliphatic monocarboxylic acid anhydride are formed. Preferred aliphatic monocarboxylic acid anhydrides are acetic anhydride, propionic anhydride or butyric anhydride, which react with water to acetic acid, propionic acid or butyric acid. The most preferred aliphatic monocarboxylic acid anhydride is acetic anhydride. Aliphatic monocarboxylic acids like acetic acid, propionic acid and butyric acid are liquid at 20° C. and atmospheric pressure. They can act as a reaction diluent in the subsequent esterification reaction. The reaction of water in the moist cellulose ether with a dicarboxylic acid anhydride is typically less desirable because the formed dicarboxylic acid typically is solid at 20° C. and atmospheric pressure and is an undesirable by-product in the reaction mixture. When water in the moist cellulose ether is reacted with an aliphatic monocarboxylic acid anhydride, the total molar amount of aliphatic monocarboxylic acid anhydride depends to a large extent from the water content in the moist cellulose ether. The total molar amount of aliphatic monocarboxylic acid anhydride used in the reaction of the present invention preferably corresponds to the sum of i) the molar amount of water in the moist cellulose ether plus ii) a molar amount of aliphatic monocarboxylic acid anhydride used for esterification such that the molar ratio between the aliphatic monocarboxylic acid anhydride and the anhydroglucose units of the cellulose ether is at least 0.1/1, preferably at least 0.3/1, more preferably at least 0.5/1, most preferably at least 1/1 and particularly at least 1.5/1; and up 17/1, preferably up to 10/1, more preferably up to 8/1, most preferably up to 6/1, and particularly up to 4/1. The molar ratio between the anhydride of a dicarboxylic acid and the anhydroglucose units of the cellulose ether generally is 0.1/1 or more, and preferably 0.2/1 or more. The molar ratio between the anhydride of a dicarboxylic acid and the anhydroglucose units of cellulose ether generally is 1.5/1 or less, and preferably 1/1 or less.

The molar number of anhydroglucose units of the cellulose ether utilized in the process of the present invention can be determined from the weight of the cellulose ether used as a starting material, by calculating the average molecular weight of the substituted anhydroglucose units from the DS(alkoxyl) and MS(hydroxyalkoxyl). The total amount of aliphatic monocarboxylic acid anhydride can be added in portions, i.e. the moist cellulose ether can be mixed with a first amount of aliphatic monocarboxylic acid anhydride that is needed to react the water in the moist cellulose ether with the aliphatic monocarboxylic acid anhydride and subsequently an additional amount of aliphatic monocarboxylic acid anhydride can be added which is needed for the esterification of the cellulose ether. To optimize the stirrability of the reaction mixture it is generally preferred to charge a portion or, more preferably, the total amount or the of aliphatic monocarboxylic acid anhydride that is used in the process of the present invention into a reaction device and to add the moist cellulose ether continuously or in portions to the aliphatic monocarboxylic acid anhydride. The temperature of the moist cellulose ether is generally at least 10° C., preferably at least 20° C., and up to 100° C., preferably up to 95° C. The reaction temperature is generally 20° C. or more, preferably 40° C. or more, and more preferably 50° C. or more. The reaction temperature is generally up to 118° C., preferably up to 110° C., and more preferably up to 100° C.

In a preferred embodiment of the invention the cellulose ether is additionally reacted with a depolymerizing agent simultaneously with or in sequence to the reaction with the aliphatic monocarboxylic acid anhydride and/or the dicarboxylic acid anhydride. Esterification of the cellulose ether with the aliphatic monocarboxylic acid anhydride and/or the dicarboxylic acid anhydride can be partially or fully completed before the cellulose ether carrying additional ester groups is reacted with the depolymerizing agent. Alternatively, the cellulose ether can be first reacted with the depolymerizing agent and then with the aliphatic monocarboxylic acid anhydride and/or the dicarboxylic acid anhydride. Alternatively, the reactions can be carried out simultaneously. The reactions of the cellulose ether with the aliphatic monocarboxylic acid anhydride and/or the dicarboxylic acid anhydride and with the depolymerizing agent can be conducted in the same or in different reaction devices. If the esterification reaction and the reaction with the depolymerizing agent are conducted in sequence, intermediate isolation steps or purification steps are not necessary and typically not carried out. Preferably, the reaction of the cellulose ether with an aliphatic monocarboxylic acid anhydride and/or a dicarboxylic acid anhydride is conducted in the presence of a depolymerizing agent, i.e. the esterification and the oxidation reactions are conducted simultaneously under the reaction conditions, such as temperature, pressure and duration as specified above for the esterification reaction.

Most preferably, the moist cellulose ether is mixed with an aliphatic monocarboxylic acid anhydride to react water in the moist cellulose ether with the aliphatic monocarboxylic acid anhydride and subsequently a dicarboxylic acid anhydride, an esterification catalyst, a depolymerizing agent and optionally an additional amount of aliphatic monocarboxylic acid anhydride are added to esterify the and partially depolymerize the cellulose ether. An additional amount of reaction medium, in addition to the aliphatic monocarboxylic acid that is formed in the reaction of water with aliphatic monocarboxylic acid anhydride may also be added. Preferred reactants and reaction conditions are described above.

When reacting water in the moist cellulose ether with an aliphatic monocarboxylic acid anhydride, a corresponding aliphatic monocarboxylic acid, such as acetic acid, propionic acid, or butyric acid, is formed which acts as a reaction medium in the subsequent esterification reaction. Depending on the amount of formed aliphatic monocarboxylic acid, an additional amount of reaction medium is added. The reaction medium can comprise minor amounts of other solvents or diluents which are liquid at 20° C. and do not react with the cellulose ether, such as aromatic or aliphatic solvents like benzene, toluene, 1,4-dioxane, or tetrahydrofurane; or halogenated $C_1$-$C_3$ derivatives, like dichloro methane or dichloro methyl ether, but the amount of the aliphatic monocarboxylic acid should generally be more than 50 percent, preferably at least 75 percent, and more preferably at least 90 percent, based on the total weight of the reaction medium. Most preferably the reaction medium consists of an aliphatic monocarboxylic acid. The total amount of the aliphatic monocarboxylic acid, i.e., the amount of aliphatic monocarboxylic acid that is formed by reacting water in the moist cellulose ether with the aliphatic monocarboxylic acid anhydride (2 moles of aliphatic monocarboxylic acid are formed per mole of aliphatic monocarboxylic acid anhydride that reacts with water) and the amount of aliphatic monocarboxylic acid added to the reaction mixture, if any, generally is at least 200 parts, preferably at least 300 parts, more preferably at least 400 parts, and most preferably at least 600 parts by weight, per 100 weight parts of the cellulose ether, and up to 2000 parts, preferably up to 1500 parts, more preferably up to 1000 parts and most preferably up to 800 parts by weight per 100 weight parts of the cellulose ether, the weight of the cellulose ether being calculated based on its absolutely dry weight.

The cellulose ether, preferably an above-mentioned hydroxypropyl methylcellulose, is reacted with an aliphatic monocarboxylic acid anhydride and/or a dicarboxylic acid anhydride to produce an esterified cellulose ether, preferably hydroxypropyl methylcellulose acetate succinate (HPMCAS). Preferred aliphatic monocarboxylic acid anhydrides and preferred amounts are listed above. Preferred dicarboxylic acid anhydrides are selected from the group consisting of succinic anhydride, maleic anhydride and phthalic anhydride. A preferred aliphatic monocarboxylic acid anhydride can be used alone; or a preferred dicarboxylic acid anhydride can be used alone; or a preferred aliphatic monocarboxylic acid anhydride can be used in combination with a preferred dicarboxylic acid anhydride. When it is desired to react the cellulose ether only with a dicarboxylic acid anhydride, for example for producing hydroxypropyl methylcellulose phthalate, the water in the moist cellulose is first reacted with such an amount of aliphatic monocarboxylic acid anhydride that essentially the entire amount of the aliphatic monocarboxylic acid anhydride is consumed in the reaction with water and the formation of the corresponding aliphatic monocarboxylic acid. In a preferred embodiment of the invention the cellulose ether is reacted with an aliphatic monocarboxylic acid anhydride and a dicarboxylic acid anhydride The esterification reaction is generally conducted in the presence of an esterification catalyst, preferably in the presence of an alkali metal carboxylate, such as sodium acetate or potassium acetate. The amount of the alkali metal carboxylate is generally 20 to 200 parts by weight of the alkali metal carboxylate per 100 parts by weight of the cellulose ether. The molar ratio [alkali metal carboxylate/anhydroglucose units of cellulose ether] is preferably from [0.4/1.0] to [3.8/1.0], more preferably from [1.5/1.0] to [3.5/1.0], and most preferably from [1.9/1.0] to [3.0/1.0].

The reaction temperature for the esterification is generally 60° C. or more, and preferably 70° C. or more. The reaction temperature is generally up to 110° C., preferably up to 100° C. The esterification reaction is typically completed within 2 to 25 hours, more typically within 2 to 8 hours. Suitable reaction devices for carrying out the esterification reaction, such as batch reactors or reaction vessels, are known in the art. Preferred are reactors equipped with a stirring device or kneaders.

After completion of the esterification reaction, the reaction product can be precipitated from the reaction mixture in a known manner, for example by contacting the reaction mixture with a large volume of water, such as described in U.S. Pat. No. 4,226,981, International Patent Application WO 2005/115330 or European Patent Application EP 0 219 426. In a preferred embodiment of the invention the reaction product is precipitated from the reaction mixture as described in International Patent Application PCT/US13/030394, published as WO2013/148154, to produce an esterified cellulose ether in the form of a powder.

According to the process of the present invention an esterified cellulose ether is produced that has (i) aliphatic monovalent acyl groups and/or (ii) groups of the formula —C(O)—R—COOA, wherein R is a divalent aliphatic or aromatic hydrocarbon group and A is hydrogen or a cation. The cation preferably is an ammonium cation, such as $NH_4^+$ or an alkali metal ion, such as the sodium or potassium ion, more preferably the sodium ion. Most preferably, A is hydrogen. The aliphatic monovalent acyl groups are preferably selected from the group consisting of acetyl, propionyl, and butyryl, such as n-butyryl or i-butyryl. Preferred groups of the formula —C(O)—R—COOA are
—C(O)—$CH_2$—$CH_2$—COOA, such as —C(O)—$CH_2$—$CH_2$—COOH or —C(O)—$CH_2$—$CH_2$—COO$^-$$Na^+$,
—C(O)—CH=CH—COOA, such as —C(O)—CH=CH—COOH or —C(O)—CH=CH—COO$^-$$Na^+$, or
—C(O)—$C_6H_4$—COOA, such as —C(O)—$C_6H_4$—COOH or —C(O)—$C_6H_4$—COO$^-$$Na^+$. In the groups of formula —C(O)—$C_6H_4$—COOA the carbonyl group and the carboxylic group are preferably arranged in ortho-positions.

Preferred esterified cellulose ethers produced according to the process of the present invention are:

i) HPMCXY and HPMCX, wherein HPMC is hydroxypropyl methyl cellulose, X is A (acetate), or X is B (butyrate) or X is Pr (propionate) and Y is S (succinate), or Y is P (phthalate) or Y is M (maleate), such as hydroxypropyl methyl cellulose acetate phthalate (HPMCAP), hydroxypropyl methyl cellulose acetate maleate (HPMCAM), hydroxypropyl methylcellulose acetate succinate (HPMCAS) or hydroxypropyl methyl cellulose acetate (HPMCA); or ii) hydroxypropyl methyl cellulose phthalate (HPMCP); hydroxypropyl cellulose acetate succinate (HPCAS), hydroxybutyl methyl cellulose propionate succinate (HBMCPrS), hydroxyethyl hydroxypropyl cellulose propionate succinate (HEHPCPrS); and methyl cellulose acetate succinate (MCAS).

Hydroxypropyl methylcellulose acetate succinate (HPMCAS) is the most preferred esterified cellulose ether.

The esterified cellulose ethers produced according to the process of the present invention preferably have a DS(methoxyl) and an MS(hydroxyalkoxyl) as indicated further above. The esterified cellulose ethers produced according to the process of the present invention have a degree of substitution of aliphatic monovalent acyl groups, such as acetyl, propionyl, or butyryl groups, of 0 (zero) or preferably at least 0.05, more preferably at least 0.10, most preferably at least 0.15, and particularly at least 0.20. The degree of substitution of aliphatic monovalent acyl groups is generally up to 1.75, preferably up to 1.50, more preferably up to 1.25, and most preferably up to 1.00. The esterified cellulose ethers generally have a degree of substitution of groups of formula —C(O)—R—COOA, such as succinoyl, of 0 (zero) or preferably at least 0.05, more preferably at least 0.10. The degree of substitution of groups of formula —C(O)—R—COOA, such as succinoyl, is generally up to 1.6, preferably up to 1.30, more preferably up to 1.00, most preferably up to 0.70, and particularly up to 0.60. The sum of i) the degree of substitution of aliphatic monovalent acyl groups and ii) the degree of substitution of groups of formula —C(O)—R—COOA is greater than 0. It is generally at least 0.10, preferably at least 0.20, more preferably at least 0.30, and most preferably at least 0.40. This sum is generally up to 1.9, preferably up to 1.55, more preferably up to 1.15, and particularly up to 1.00.

The content of the acetate and succinate ester groups is determined according to "Hypromellose Acetate Succinate, United States Pharmacopia and National Formulary, NF 29, pp. 1548-1550". Reported values are corrected for volatiles (determined as described in section "loss on drying" in the above HPMCAS monograph).The method may be used in analogue manner to determine the content of propionyl, butyryl, phthalyl and other ester groups.

The content of ether groups in the esterified cellulose ether is determined in the same manner as described for "Hypromellose", United States Pharmacopeia and National Formulary, USP 35, pp 3467-3469.

The contents of ether and ester groups obtained by the above analyses are converted to DS and MS values of individual substituents according to the formulas below. The formulas may be used in analogue manner to determine the DS and MS of substituents of other cellulose ether esters.

percent lower than the weight average molecular weight of the cellulose ether used as a starting material for producing the esterified cellulose ether, which reduction in $M_w$ is caused by the treatment with the depolymerizing agent.

The esterified cellulose ethers typically have a Polydispersity $M_w/M_n$ of at least 1.3, and more typically at least 1.5. Moreover, the esterified cellulose ethers typically have a Polydispersity of up to 3.5, preferably up to 3.0, more preferably up to 2.8, and most preferably of up to 2.6. The Polydispersity $M_w/M_n$ is calculated based on the determination of the weight average molecular weight $M_w$ and the number average molecular weight $M_n$.

$$\% \text{ cellulose backbone} = 100 - \left(\% \text{ MeO} * \frac{M(OCH_3) - M(OH)}{M(OCH_3)}\right) - \left(\% \text{ HPO} * \frac{M(OCH_2CH(OH)CH_3) - M(OH)}{M(OCH_2CH(OH)CH_3)}\right) - \left(\% \text{ Acetyl} * \frac{M(COCH_3) - M(H)}{M(COCH_3)}\right) - \left(\% \text{ Succinoyl} * \frac{M(COC_2H_4COOH) - M(H)}{M(COC_2H_4COOH)}\right)$$

$$DS(\text{Me}) = \frac{\frac{\% \text{ MeO}}{M(OCH_3)}}{\frac{\% \text{ cellulose Backbone}}{M(AGU)}} \quad MS(\text{HP}) = \frac{\frac{\% \text{ HPO}}{M(HPO)}}{\frac{\% \text{ cellulose Backbone}}{M(AGU)}}$$

$$DS(\text{Acetyl}) = \frac{\frac{\% \text{ Acetyl}}{M(\text{Acetyl})}}{\frac{\% \text{ cellulose Backbone}}{M(AGU)}} \quad DS(\text{Succinoyl}) = \frac{\frac{\% \text{ Succinoyl}}{M(\text{Succinoyl})}}{\frac{\% \text{ cellulose Backbone}}{M(AGU)}}$$

$M(\text{MeO}) = M(OCH_3) = 31.03 \text{ Da}$ $M(\text{Acetyl}) = M(COCH_3) = 43.04 \text{ Da}$ $M(\text{AGU}) = 162.14 \text{ Da}$ $M(\text{HPO}) = M(OCH_2CH(OH)CH_3) = 75.09 \text{ Da}$ $M(\text{Succinoyl}) = M(COC_2H_4COOH) = 101.08 \text{ Da}$ $M(\text{OH}) = 17.008 \text{ Da}$ $M(\text{H}) = 1.008 \text{ Da}$ By convention, the weight percent is an average weight percentage based on the total weight of the cellulose repeat unit, including all substituents. The content of the methoxyl group is reported based on the mass of the methoxyl group (i.e., —$OCH_3$). The content of the hydroxyalkoxyl group is reported based on the mass of the hydroxyalkoxyl group (i.e., —O-alkylene-OH); such as hydroxypropoxyl (i.e., —O—$CH_2CH(CH_3)$—OH). The content of acetyl group is reported based on the mass of —C(O)—$CH_3$. The content of the succinoyl groups is reported based on the mass of this group, i.e.,—C(O)—$CH_2$—$CH_2$—COOH.

According to the above described process esterified cellulose ethers are produced which generally have a weight average molecular weight $M_w$ of 10,000 Dalton or more, preferably 20,000 Dalton or more, more preferably 30,000 Dalton or more, and most preferably 80,000 Dalton or more. The esterified cellulose ethers generally have a weight average molecular weight $M_w$ of up to 500,000 Dalton, preferably up to 450,000 Dalton, more preferably up to 350,000 Dalton, even more preferably up to 250,000 Dalton, and particularly up to 200,000 Dalton or up to 120,000 Dalton. When using a depolymerizing agent in the esterification reaction as described above, the weight average molecular weight $M_w$ of the esterified cellulose ether is typically at least 25 percent lower, more typically at least 40

The esterified cellulose ethers generally have a number average molecular weight $M_n$ of 5000 Dalton or more, preferably 10,000 Dalton or more, more preferably 20,000 Dalton or more, and most preferably 25,000 Dalton or more. The esterified cellulose ethers generally have a number average molecular weight $M_n$ of up to 150,000 Dalton, preferably up to 110,000 Dalton, more preferably up to 90,000 Dalton, and most preferably up to 50,000 Dalton.

$M_w$ and $M_n$ are measured by SEC-MALLS using as mobile phase a mixture which has been produced by mixing 40 parts by volume of acetonitrile and 60 parts by volume of aqueous buffer containing 50 mM $NaH_2PO_4$ and 0.1 M $NaNO_3$. The mobile phase is adjusted to a pH of 8.0. SEC-MALLS stands for Size Exclusion Chromatography coupled with a mass sensitive Multi Angle Laser Light Scattering detector. The procedure is described in Journal of Pharmaceutical and Biomedical Analysis 56 (2011) 743-748. The measurement of $M_w$ and $M_n$ is described in more details in the Examples.

The esterified cellulose ethers generally have a viscosity of up to 200 mPa·s, preferably up to 100 mPa·s, more preferably up to 50 mPa·s, even more preferably up to 30 mPa·s, most preferably up to 10 mPa·s, and particularly up to 5 mPa·s, measured as a 2.0 wt.-% solution of the esterified cellulose ether in 0.43 wt.-% aqueous NaOH at 20° C.

Generally the viscosity is at least 1.2 mPa·s, typically at least 1.8 mPa·s, and more typically at least 2.4 mPa·s, measured as a 2.0 wt.-% solution of the esterified cellulose ether in 0.43 wt.-% aqueous NaOH at 20° C. The 2.0% by weight solution of the esterified cellulose ether is prepared as described in "Hypromellose Acetate Succinate, United States Pharmacopia and National Formulary, NF 29, pp. 1548-1550", followed by an Ubbelohde viscosity measurement according to DIN 51562-1:1999-01 (January 1999).

Some embodiments of the invention will now be described in detail in the following Examples.

EXAMPLES

Unless otherwise mentioned, all parts and percentages are by weight. In the Examples the following test procedures are used.

Viscosity of Hydroxypropyl Methyl Cellulose (HPMC) Samples

The viscosity of the cellulose ether was determined as a 2 weight-% solution in water at 20° C. as described in the United States Pharmacopeia (USP 35, "Hypromellose", pages 423-424 and 3467-3469). As described in the United States Pharmacopeia, viscosities of less than 600 mPa·s were determined by an Ubbelohde viscosity measurement and viscosities of 600 mPa·s or more were determined using a Brookfield viscometer. Descriptions on preparing the 2 wt. % HPMC solution and both Ubbelohde and Brookfield viscosity measurement conditions are disclosed in the United States Pharmacopeia (USP 35, "Hypromellose", pages 423-424 and 3467-3469 and in ASTM D-445 and ISO 3105 referenced therein).

Viscosity of Hydroxypropyl Methyl Cellulose Acetate Succinate (HPMCAS)

The 2.0% by weight solution of the HPMCAS in 0.43 wt.-% aqueous NaOH was prepared as described in "Hypromellose Acetate Succinate, United States Pharmacopia and National Formulary, NF 29, pp. 1548-1550", followed by an Ubbelohde viscosity measurement at 20° C. according to DIN 51562-1:1999-01 (January 1999).

Content of Ether and Ester Groups of HPMCAS

The content of ether groups in the esterified cellulose ether was determined in the same manner as described for "Hypromellose", United States Pharmacopeia and National Formulary, USP 35, pp 3467-3469.

The ester substitution with acetyl groups (—CO—CH$_3$) and the ester substitution with succinoyl groups (—CO—CH$_2$—CH$_2$—COOH) were determined according to Hypromellose Acetate Succinate, United States Pharmacopia and National Formulary, NF 29, pp. 1548-1550". Reported values for ester substitution were corrected for volatiles (determined as described in section "loss on drying" in the above HPMCAS monograph).

Determination of $M_w$ and $M_n$ of HPMCAS

Mw and Mn were measured according to Journal of Pharmaceutical and Biomedical Analysis 56 (2011) 743 unless stated otherwise. The mobile phase was a mixture of 40 parts by volume of acetonitrile and 60 parts by volume of aqueous buffer containing 50 mM NaH$_2$PO$_4$ and 0.1 M NaNO$_3$. The mobile phase was adjusted to a pH of 8.0. Solutions of the cellulose ether esters were filtered into a HPLC vial through a syringe filter of 0.45 μm pore size.

More specifically, the utilized Chemicals and solvents were: Polyethylene oxide standard materials (abbreviated as PEOX 20 K and PEOX 30 K) were purchased from Agilent Technologies, Inc. Palo Alto, CA, catalog number PL2083-1005 and PL2083-2005.

Acetonitrile (HPLC grade ≥99.9%, CHROMASOL plus), catalog number 34998, sodium hydroxide (semiconductor grade, 99.99%, trace metal base), catalog number 306576, water (HPLC grade, CHROMASOLV Plus) catalog number 34877 and sodium nitrate (99.995%, trace metal base) catalog number 229938 were purchased from Sigma-Aldrich, Switzerland.

Sodium dihydrogen phosphate (≥99.999% TraceSelect) catalog number 71492 was purchased from FLUKA, Switzerland.

The normalization solution of PEOX20 K at 5 mg/mL, the standard solution of PEOX30 K at 2 mg/mL, and the sample solution of HPMCAS at 2 mg/mL were prepared by adding a weighed amount of polymer into a vial and dissolving it with a measured volume of mobile phase. All solutions were allowed to dissolve at room temperature in the capped vial for 24 h with stirring using a PTFE-coated magnetic stirring bar.

The normalization solution (PEOX 20k, single preparation, N) and the standard solution (PEOX30 K, double preparation, S1 and S2) were filtered into a HPLC vial through a syringe filter of 0.02 μm pore size and 25 mm diameter (Whatman Anatop 25, catalog number 6809-2002), Whatman.

The test sample solution (HPMCAS, prepared in duplicate, T1, T2) and a laboratory standard (HPMCAS, single preparation, LS) were filtered into a HPLC vial through a syringe filter of 0.45 μm pore size (Nylon, e.g. Acrodisc 13 mm VWR catalog number 514-4010).

Chromatographic condition and run sequence were conducted as described by Chen, R. et al.; Journal of Pharmaceutical and Biomedical Analysis 56 (2011) 743-748). The SEC-MALLS instrument set-up included a HP1100 HPLC system from Agilent Technologies, Inc. Palo Alto, Calif.; a DAWN Heleos II 18 angle laser light scattering detector and a OPTILAB rex refractive index detector, both from Wyatt Technologies, Inc. Santa Barbara, Calif. The analytical size exclusion column (TSK-GEL® GMPWXL, 300×7.8 mm) was purchased from Tosoh Bioscience. Both the OPTILAB and the DAWN were operated at 35° C. The analytical SEC column was operated at room temperature (24±5° C.). The mobile phase was a mixture of 40 volume parts of acetonitrile and 60 volume parts of aqueous buffer containing 50 mM NaH2PO4 and 0.1 M NaNO3 prepared as follows:

Aqueous buffer: 7.20 g of sodium dihydrogen phosphate and 10.2 g of sodium nitrate were added to 1.2 L purified water in a clean 2 L glass bottle under stirring until dissolution.

Mobile phase: 800 mL of acetonitrile were added to 1.2 L of the aqueous buffer prepared above, and stirred until a good mixture was achieved and the temperature equilibrated to ambient temperature.

The mobile phase was pH adjusted to 8.0 with 10M NaOH and filtered through a 0.2 m nylon membrane filter. The flow rate was 0.5 mL/min with in-line degassing. The injection volume was 100 μL and the analysis time was 35 min.

The MALLS data were collected and processed by Wyatt ASTRA software (version 5.3.4.20) using dn/dc value (refractive index increment) of 0.120 mL/g for HPMCAS. The light scattering signals of detector Nos. 1-4, 17, and 18) were not used in the molecular weight calculation. A representative chromatographic run sequence is given below: B, N, LS, S1 (5×), S2, T1 (2×), T2 (2×), T3 (2×), T4 (2×), S2, T5(2×), etc., S2, LS, W, where, B represents blank injection of mobile phase, N1 represents normalization solution; LS represents a laboratory standard HPMCAS; S1 and S2 represent standard solutions one and two, respectively; T1, T2, T3, T4, and T5 represent test sample solutions and W represents water injection. (2×) and (5×) denote the number of injections of the same solution.

Both the OPTILAB and the DAWN were calibrated periodically according to the manufacturer's recommended procedures and frequency. A 100 μL injection of a 5 mg/mL polyethylene oxide standard (PEOX20 K) was employed for normalizing all angle light scattering detectors relative to 90° detector for each run sequence.

Use of this mono-dispersed polymer standard also enabled the volume delay between the OPTILAB and the DAWN to be determined, permitting proper alignment of the light scattering signals to the refractive index signal. This is necessary for the calculation of the weight-averaged molecular weight (Mw) for each data slice.

Utilized Hydroxypropyl Methylcellulose (HPMC) for Comparative Examples A-D

The HPMC E4M had a methoxyl substitution ($DS_M$) and hydroxypropoxyl substitution ($MS_{HP}$) as listed in Table 2 below and a viscosity of 3729 mPa·s, measured as a 2% solution in water at 20° C. according to the Brookfield method described above using Rotor No. 4 at 60 rpm. The weight average molecular weight of the HPMC E4M was 305330 Dalton (305 kDa). Dalton. The HPMC E4M is a high viscosity HPMC which is commercially available from The Dow Chemical Company as Methocel E4M cellulose ether and which has a moisture content of 1.4 weight percent, based on the total weight of the HPMC E4M.

Utilized HPMC for Example 1 (HPMC Wet Cake 1)

A wet HPMC was used which had a content of absolutely dry HPMC of 38.77%, hereafter called "HPMC Wet Cake 1". The HPMC in the HPMC wet cake had a methoxyl substitution ($DS_M$) and hydroxypropoxyl substitution ($MS_{HP}$) as listed in Table 2 below and a viscosity of 5026 mPa·s, measured as a 2% solution in water at 20° C. according to the Brookfield method described above using Rotor No. 4 at 60 rpm.

Utilized HPMC for Example 2 (Wet Cake 2)

A wet HPMC was used which had a content of absolutely dry HPMC of 50.4%, hereafter called "HPMC Wet Cake 2". The HPMC in the HPMC wet cake had a methoxyl substitution ($DS_M$) and hydroxypropoxyl substitution ($MS_{HP}$) as listed in Table 2 below and a viscosity of 3729 mPa·s, measured as a 2% solution in water at 20° C. according to the Brookfield method described above using Rotor No. 4 at 60 rpm.

Production of Hydroxypropyl Methyl Cellulose Acetate Succinate (HPMCAS) of Comparative Examples A-D (Comparative, but not Prior Art)

Glacial acetic acid, HPMC E4M, acetic anhydride, succinic anhydride, sodium acetate (water free) and potassium chlorate were introduced in the amounts listed in Table 1 below into a reaction vessel of 3 L volume. The glacial acetic acid was readily absorbed by the HPMC powder. The mass in the reaction vessel had a solid appearance. The mass in the reaction vessel was heated at 85° C. for 3.5 hours to effect esterification. During the heating period the mass could not be stirred. At 85° C. the mass could be stirred but no homogeneous mixture could be achieved. While the esterification and partial depolymerization proceeded, the stirring ability of reaction mixture improved, but a homogeneous mixture could still not be achieved for an extended time period. Only after the completion of the reaction after 3.5 hours a homogeneous reaction solution was formed. Then 1.8 L of cold water was added to the reaction mixture under stirring to precipitate the HPMCAS. The precipitated product was removed from the reactor and washed with 20 L of water by applying high shear mixing using an Ultra-Turrax stirrer S50-G45 running at 5200 rpm. The product was isolated by filtration and dried at 55° C. overnight.

Example 1

512 g (5.0 moles) of acetic anhydride was loaded to a reactor and heated to 51° C. Then 128.97 g HPMC Wet Cake 1 (absolutely dry HPMC content 38.77%) was loaded in portions to the reactor under stirring. 128.97 g HPMC wet cake corresponded to 50 g HPCM, calculated on the dried basis, and 78.97 g (4.38 moles) of water.

Then the temperature was increased to 70° C. A slight exothermic reaction was observed, but no acetic acid or acetic anhydride was refluxed at the condenser. The complete HPMC was dissolved after 30 min without agitation issues (300 rpm). Then 14 g of succinic anhydride was loaded to the reactor (850 rpm) and after 10 min 50 g sodium acetate and 1.67 g of potassium chlorate were added. The temperature was increased to 85° C. (300 rpm) and the mixture was reacted for 3.5 h. Then the crude HPMCAS was recovered by precipitation with cold water and the product washed with hot water and filtrated several times.

Example 2

279 g (11.53 moles) of acetic anhydride was loaded to a reactor and heated to 51° C. 99.21 g HPMC Wet Cake 2 (absolutely dry HPMC content 50.4%) corresponded to 50 g HPCM, calculated on the dried basis, and 49.21 g (2.74 moles) of water. Then the temperature was increased to 70° C. An exothermic reaction was observed, acetic acid or acetic anhydride refluxed at the condenser for a short time. The complete HPMC was dissolved after 30 min (100 rpm). Then the temperature was increased to 85° C. and 0.38 g of sulfuric acid solution in glacial acetic acid (a mixture of 20 g of 85% sulfuric acid and 80 g of glacial acetic acid) was added and the mixture was allowed to react for 30 min. To stop the degradation reaction 0.06 g of NaOH was added to the reactor. Then 14 g of succinic anhydride and 65 g of acetic anhydride was loaded to the reactor (850 rpm) and within 6 min 50 g sodium acetate was added. The temperature was increased to 85° C. (300 rpm) and the mixture was reacted for 3.5 hour. Then the crude HPMCAS was recovered by precipitation with water and the product washed with water and filtrated several times.

Production of HPMCAS of Comparative Example E

The procedure of Comparative Examples A-D was repeated, except that low viscosity HPMC E3 LV was used instead of high viscosity HPMC E4M and the reaction was carried out in the absence of potassium chlorate. The reaction mixture consisting of glacial acetic acid, HPMC E3 LV, acetic anhydride, succinic anhydride and sodium acetate (water free) as listed in Table 1 below was well stirrable from the start.

The comparison between Example 1 and Comparative Examples A-D illustrates that an equally good esterification reactivity is achieved when moist cellulose ether is used for esterification and the water in the moist cellulose ether is reacted with an aliphatic monocarboxylic acid anhydride to the corresponding aliphatic monocarboxylic acid than when a dry cellulose ether is used for the esterification. This finding reduces or completely eliminates the time, labor and energy consuming drying step after the production and washing of the cellulose ether.

Moreover, it has surprisingly been found that the stirrability of the reaction mixture can be significantly improved when a moist cellulose ether is used as a starting material. This allows the usage of a higher viscosity cellulose ether for esterification. Partial depolymerization of the cellulose ether for lowering its molecular weight can be carried out in situ during the esterification step and avoids a separate depolymerization step.

The comparison between Example 1 and Comparative Example E illustrates that an esterified cellulose ether of similar molecular weight is achieved when starting from a moist high viscosity cellulose ether and carrying out partial depolymerization in situ as when starting from a dry low viscosity cellulose ether. Hence, the preferred embodiment of the invention, wherein a high viscosity moist cellulose ether is used for esterification and partial depolymerization is carried out in situ, avoids multiple steps after the production of the cellulose ether, specifically the steps of i) drying and grinding the cellulose ether, and ii) the known partial depolymerization of cellulose ethers with an acid, such as HCl, followed by neutralization and purification before the esterification step and the handling steps associated with steps i) and ii), such as packaging and storing. Hence the cost-intensive multi-step process for producing esterified cellulose ethers is simplified and the number of reaction steps is reduced. Thus the production costs are significantly reduced while the same quality of esterified cellulose ether is achieved.

The invention claimed is:

1. A process for producing an esterified cellulose ether wherein
   a moist cellulose ether having a viscosity of at least 50 mPa·s, measured as a 2 weight-% solution in water at 20 °C. and having a water content of at least 10 percent, based on the weight of the moist cellulose ether, is reacted with an aliphatic monocarboxylic acid anhydride, a dicarboxylic acid anhydride or a combination thereof.

2. The process of claim 1 wherein the moist cellulose ether is additionally reacted with a depolymerizing agent simultaneously with or in sequence to the reaction with the aliphatic monocarboxylic acid anhydride and/or the dicarboxylic acid anhydride, the depolymerizing agent being an inorganic acid or an oxidizing agent different from oxygen.

3. A process for producing an esterified cellulose ether comprising the steps of
   a) reacting cellulose with an alkaline material to produce alkali cellulose,
   b) reacting the produced alkali cellulose with one or more etherifying agents and washing the produced cellulose ether to obtain a moist cellulose ether having a water content of at least 10 weight percent, and
   c) reacting the moist cellulose ether with an aliphatic monocarboxylic acid anhydride and/or a dicarboxylic acid anhydride and with a depolymerizing agent selected from inorganic acids and oxidizing agents different from oxygen.

TABLE 1

| (Comp.) Example | Type HPMC used as starting material | Amount HPMC* g | Amount HPMC* mol | acetic acid g | acetic acid mol/mol HPMC | Succinic anhydride g | Succinic anhydride mol/mol HPMC | Acetic anhydride g | Acetic anhydride mol/mol HPMC | Sodium acetate g | Sodium acetate mol/mol HPMC | Potassium chlorate g | Potassium chlorate mol/mol HPMC |
|---|---|---|---|---|---|---|---|---|---|---|---|---|---|
| A | HPMC E4M | 150 | 0.74 | 750 + 320 | 24 | 42.0 | 0.57 | 195.0 | 2.69 | 150.0 | 2.47 | 10 | 0.11 |
| B | HPMC E4M | 150 | 0.74 | 750 | 16.8 | 42.0 | 0.57 | 195.0 | 2.69 | 150.0 | 2.47 | 3 | 0.033 |
| C | HPMC E4M | 150 | 0.74 | 750 | 16.8 | 42.0 | 0.57 | 195.0 | 2.69 | 150.0 | 2.47 | 2 | 0.022 |
| D | HPMC E4M | 150 | 0.74 | 750 | 16.8 | 42.0 | 0.57 | 195.0 | 2.69 | 150.0 | 2.47 | 1 | 0.011 |
| 1 | HPMC Wet Cake 1 | 50 | 0.25 | — | — | 14 | 0.57 | 512 | ** | 50 | 2.47 | 1.67 | 0.055 |
| 2 | HPMC Wet Cake 2 | 50 | 0.25 | — | — | 14 | 0.57 | 344 | *** | 50 | 2.47 | 0 | 0 |
| E | HPMC E3 LV | 150 | 0.74 | 750 | 16.8 | 42.0 | 0.57 | 195.0 | 2.69 | 150.0 | 2.47 | — | — |

*calculated on the dried basis
**5.0 moles of acetic anhydride, of which 4.38 moles react with water resulting in 8.76 moles of acetic acid (35.0 mol/mol HPMC) and leaving 0.62 moles acetic anhydride (2.48 mol/mol HPMC) that can react with HPMC.
***3.34 moles of acetic anhydride, of which 2.74 moles react with water resulting in 5.48 moles of acetic acid (21.9 mol/mol HPMC) and leaving 0.60 moles acetic anhydride (2.40 mol/mol HPMC) that can react with HPMC.

TABLE 2

| (Comp.) Example | Molecular weight (kDa) Mn | Molecular weight (kDa) Mw | Mw/Mn | Ether Substitution Methoxyl (%) | Ether Substitution Hydroxypropyl (%) | Ester substitution Acetyl (%) | Ester substitution Succinoyl (%) | Ether Substitution $DS_M$ | Ether Substitution $MS_{HP}$ | Ester substitution $DOS_{Ac}$ | Ester substitution $DOS_s$ | 2% in viscosity NaOH [mPa·s] |
|---|---|---|---|---|---|---|---|---|---|---|---|---|
| A | 24 | 37 | 1.5 | 22.5 | 7.6 | 8.0 | 11.1 | 1.80 | 0.25 | 0.46 | 0.27 | 2.37 |
| B | 43 | 101 | 2.3 | 23.0 | 7.5 | 8.9 | 11.5 | 1.89 | 0.25 | 0.53 | 0.29 | 4.38 |
| C | 50 | 138 | 2.8 | 23.2 | 7.5 | 8.7 | 11.5 | 1.90 | 0.25 | 0.51 | 0.29 | 5.68 |
| D | 83 | 253 | 3.0 | 23.1 | 7.6 | 8.7 | 11.7 | 1.90 | 0.26 | 0.52 | 0.30 | 10.2 |
| 1 | 22 | 37 | 1.7 | 22.2 | 7.5 | 10.7 | 7.2 | 1.74 | 0.24 | 0.61 | 0.17 | 2.74 |
| 2 | 123 | 268 | 2.2 | 23.7 | 7.8 | 10.0 | 8.6 | 1.91 | 0.26 | 0.58 | 0.21 | 40.4 |
| E | 23 | 44 | 1.9 | 23.6 | 7.7 | 8.8 | 11.8 | 1.95 | 0.26 | 0.53 | 0.30 | 2.93 |

4. The process of claim 2 wherein tine depolymerizing agent is an oxidizing agent different from oxygen.

5. The process of claim 4 wherein the depolymerizing agent is selected from the group consisting of alkali metal chlorites, alkali metal chlorates, alkali metal perchlorates, alkali metal periodates, alkali metal hypobromites, alkali metal hypochlorites, alkali metal hypoiodites, alkali metal peroxides, and hydrogen peroxide.

6. The process of claim 5 wherein the depolymerizing agent is potassium chlorate or sodium chlorate.

7. The process of claim 1 wherein the cellulose ether has a viscosity of at least 150 mPa·s, measured as a 2 weight-% solution in water at 20 ° C.

8. The process of claim 1 wherein the cellulose ether has a viscosity of at least 500 mPa·s, measured as a 2 weight-% solution in water at 20° C.

9. The process of claim 1 wherein first water in the moist cellulose ether is reacted with an aliphatic monocarboxylic acid anhydride and subsequently the cellulose ether is reacted with an aliphatic monocarboxylic acid anhydride, a dicarboxylic acid anhydride or a combination thereof.

10. The process of claim 1 wherein the moist cellulose ether has a water content of at least 20 percent, based on the weight of the moist cellulose ether.

11. The process of claim 1 wherein the cellulose ether is alkyl cellulose, hydroxyalkylcellulose or hydroxyalkyl alkylcellulose.

12. The process of claim 1 wherein the aliphatic monocarboxylic acid anhydride is selected from the group consisting of acetic anhydride, butyric anhydride and propionic anhydride and the dicarboxylic acid anhydride is selected from the group consisting of succinic anhydride, maleic anhydride and phthalic anhydride.

13. The process of claim 1 wherein hydroxypropyl methylcellulose is esterified with succinic anhydride and acetic anhydride to produce hydroxypropyl methyl cellulose acetate succinate.

14. The process of claim 1 wherein the moist cellulose ether is mixed with an aliphatic monocarboxylic acid anhydride to react water in the moist cellulose ether with the aliphatic monocarboxylic acid anhydride and subsequently a dicarboxylic acid anhydride, an alkali metal carboxylate as esterification catalyst, and a depolymerizing agent selected from inorganic acids and oxidizing agents different from oxygen are added to esterify and partially depolymerize the cellulose ether.

15. The process of claim 1 wherein the moist cellulose ether is mixed with an aliphatic monocarboxylic acid anhydride to react water in the moist cellulose ether with the aliphatic monocarboxylic acid anhydride and subsequently
    a dicarboxylic acid anhydride,
    an alkali metal carboxylate as esterification catalyst,
    a depolymerizing agent selected from inorganic acids and oxidizing agents different from oxygen and
    an additional amount of aliphatic monocarboxylic acid anhydride are added to esterify and partially depolymerize the cellulose ether.

\* \* \* \* \*